No. 684,987. Patented Oct. 22, 1901.
A. HORNER.
CANE CULTIVATOR.
(Application filed July 24, 1901.)
(No Model.)
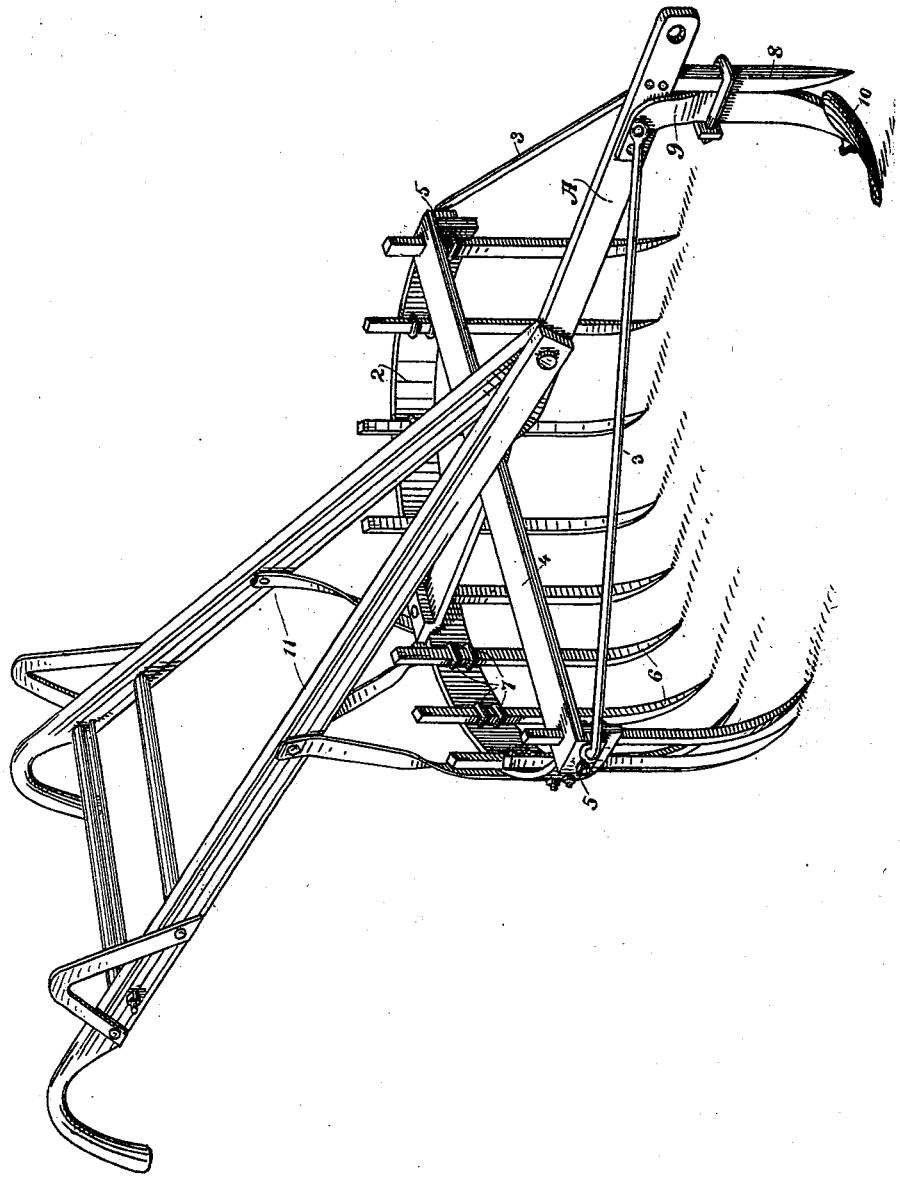

UNITED STATES PATENT OFFICE.

ALBERT HORNER, OF PAAUILO, TERRITORY OF HAWAII.

CANE-CULTIVATOR.

SPECIFICATION forming part of Letters Patent No. 684,987, dated October 22, 1901.

Application filed July 24, 1901. Serial No. 69,497. (No model.)

*To all whom it may concern:*

Be it known that I, ALBERT HORNER, a citizen of the United States, residing at Paauilo, Island of Hawaii, Hawaiian Territory, have invented an Improvement in Cane-Cultivators; and I hereby declare the following to be a full, clear, and exact description of the same.

My invention relates to a device for cultivating the ground; and it is particularly applicable to cultivating the ground where sugar-cane is raised.

It consists of a longitudinally-disposed draft-bar having a shoe and a colter arranged with relation to each other at the front end, a segment centrally fixed and projecting upon each side of the rear end, with a transverse bar connecting the ends of the segment with the draft-bar, and curved and sharpened bars having their upper ends secured around the periphery of the segment, their lower ends projecting downwardly and forming the cultivator-teeth.

My invention also comprises details of construction, which will be more fully explained by reference to the accompanying drawing, in which the figure is a general view of the cultivator.

A is a draft-bar, which is preferably made of iron of sufficient length, the front portion being of greater depth vertically than transversely, the rear portion being twisted to stand at right angles with the front portion to form a support for the segment 2, the center of which is fixed to the rear portion of the bar A, and it curves outwardly and forwardly from this point of support. Brace-rods, as 3, connect the ends of the segment with the forward part of the bar A to assist in stiffening it. Transversely across the rear flattened portion of A is secured a transverse bar 4, the ends of which are turned downwardly, and the ends of the segment 2 are bolted or fixed to these downturned ends, as shown at 5, thus giving the whole frame great stiffness for the purpose for which it is to be employed.

6 represents pointed teeth made of rectangular steel drawn to a point or sharpened at the lower end and front edges, and these teeth are secured around the periphery of the segment 2 by clips, as shown at 7. The teeth are so disposed around the segment that their front or cutting edges will be presented in the line of travel of the apparatus so as to do the most effective work.

At the front of the vertical portion of the bar A is bolted a colter or digger 8, and just at the rear of that is a forked bar 9, the upper end of which is adapted to clasp upon each side of the front portion of the bar A and behind the colter 8. This bar 9 extends downwardly and curves rearwardly and has fixed to the front lower end a curved concavo-convex plate or shoe 10, the curvature being such that the convex back portion of the shoe will press upon the ground at the rear of the colter 8, so that the two work in unison.

It will be noted that this machine, with its segmental row of teeth, will have the double function of a combined cultivator and rake. The rank weeds are not only torn up, but are gathered by the teeth as the cultivator moves along and are turned under the soil when the cultivator is discharged of its load. By forming the segment and teeth as shown it is found that enough dirt is lifted with the weeds to turn the latter under completely. This discharge takes place, and without stopping, by simply lifting the rear of the machine by the handles 11, which are fixed to the vertical sides of the draft-bar near the point where it is twisted to form the flattened rear portion.

The shoe 10, curved, as it is, rearward, serves the purpose of a fulcrum and prevents the colter-point 8 from digging too deep into the ground and consequently wrecking the machine.

Any suitable clevis, single or double tree, or other attachment for a team may be connected with the front end of the draft-bar and the apparatus thus drawn over the ground.

Having thus described my invention, what I claim as new, and desire to secure by Letters Patent, is—

1. The combination in a cultivator and rake of a longitudinal draft-bar, a segmental row of teeth attached to the rear of said bar, handles, a colter on the front end of said bar and a projection adjacent to, rearward of and in line with said colter, attached to said draft-bar, and upon which the front of the machine is supported as on a fulcrum when the rear of the machine is lifted.

2. The combination in a cultivator of a longitudinally-disposed draft-bar having the front portion with its greatest depth vertical and having the rear portion with its greatest depth horizontal, a transverse bar fixed to said horizontal portion at a point in front of the rear end, a segment having its center fixed to the horizontal portion of the rear end of the draft-bar, the ends curving forwardly, and connections by which said ends are secured to the outer ends of the transverse bar.

3. The combination in a cultivator of a longitudinal metal draft-bar having the front portion with its greatest depth vertical, and twisted so that the rear portion has its greatest depth transversely, a metal segment having its center fixed to the rear end of said draft-bar, the ends curving forwardly therefrom, a transverse bar centrally fixed across the horizontal portion of the draft-bar having its outer ends and those of the segment secured together, brace-rods extending from said united ends forwardly to the front portion of the draft-bar, and pointed or sharpened teeth, with clips by which they are fixed around the inner periphery of the segment with the points extending downwardly to enter the ground.

4. The combination in a cultivator of a longitudinal flat metal draft-bar twisted to have its greatest depth vertical in front and horizontal at the rear, a segment having the center portion fixed to the rear of the draft-bar, the ends curving outwardly and forwardly therefrom, a transverse bar centrally fixed to the draft-bar having its ends united with the ends of the segment, vertically-disposed sharpened teeth projecting downwardly and having their upper ends fixed around the inner periphery of the segment, a colter fixed to the front end of the draft-bar extending downwardly, an arm fixed to the rear of the colter curving downwardly and backwardly, and a concavo-convex shoe fixed upon the lower end of said arm extending below the point of the colter.

In witness whereof I have hereunto set my hand.

ALBERT HORNER.

Witnesses:
  F. B. WEEKS,
  A. J. CAMPBELL.